United States Patent
Gaddam et al.

(10) Patent No.: US 12,008,549 B2
(45) Date of Patent: Jun. 11, 2024

(54) FEDERATED CUSTODIAN

(71) Applicant: Visa International Service Association, San Francisco, CA (US)

(72) Inventors: Sivanarayana Gaddam, Santa Clara, CA (US); Atul Luykx, San Francisco, CA (US); Cuy Sheffield, Menlo Park, CA (US)

(73) Assignee: Visa International Service Association, San Francisco, CA (US)

( * ) Notice: Subject to any disclaimer, the term of this patent is extended or adjusted under 35 U.S.C. 154(b) by 442 days.

(21) Appl. No.: 16/518,764

(22) Filed: Jul. 22, 2019

(65) Prior Publication Data

US 2021/0027283 A1    Jan. 28, 2021

(51) Int. Cl.
*G06Q 20/36* (2012.01)
*G06Q 20/02* (2012.01)
(Continued)

(52) U.S. Cl.
CPC ....... *G06Q 20/3674* (2013.01); *G06Q 20/027* (2013.01); *G06Q 20/401* (2013.01); *H04L 9/0825* (2013.01); *H04L 9/50* (2022.05)

(58) Field of Classification Search
CPC .. G06Q 20/374; G06Q 20/027; G06Q 20/401; H04L 9/0825; H04L 9/3242; H04L 2209/38
(Continued)

(56) References Cited

U.S. PATENT DOCUMENTS 9,471,698 B1 * 10/2016 Liu .................... G06F 16/9554
9,672,499 B2    6/2017 Yang et al.
(Continued)

FOREIGN PATENT DOCUMENTS

| CN | 109523261 A * | 3/2019 | .......... G06Q 20/382 |
| KR | 201900838284 | 7/2019 | |
| WO | WO-2019068893 A1 * | 4/2019 | .......... H04L 9/3239 |

OTHER PUBLICATIONS

Application No. PCT/US2020/042797, International Search Report and Written Opinion, dated Nov. 6, 2020, 11 pages.
(Continued)

*Primary Examiner* — Courtney P Jones
(74) *Attorney, Agent, or Firm* — Kilpatrick Townsend & Stockton LLP

(57) ABSTRACT

An enhanced federated custodian system is described. One embodiment is directed to a computer system executing instructions to: receive, from one or more members of a federated blockchain on a network of computing devices, an approval for a transaction associated with an authentication capsule; generate, via a first trusted execution environment, a first machine readable code in response to receiving the approval for the transaction; transmit to a cold interaction system, the first machine readable code; and the cold interaction system comprising one or more processors and one or more memories, the one or more memories comprising instructions executable by the one or more processors to: receive the first machine readable code comprising the encrypted information and the approval; decrypt the encrypted information for the transaction and the approval; and generate a private key that corresponds to a public key for the transaction.

15 Claims, 7 Drawing Sheets

(51) Int. Cl.
 *G06Q 20/40* (2012.01)
 *H04L 9/08* (2006.01)
 *H04L 9/00* (2022.01)
(58) Field of Classification Search
 USPC .......................................................... 705/65
 See application file for complete search history.

(56) References Cited

U.S. PATENT DOCUMENTS

| | | | | |
|---|---|---|---|---|
| 11,170,370 | B1* | 11/2021 | Balakrishnan | G06Q 20/4016 |
| 2015/0262176 | A1 | 9/2015 | Langschaedel et al. | |
| 2016/0162897 | A1 | 6/2016 | Feeney | |
| 2018/0158051 | A1* | 6/2018 | Arora | G06Q 20/401 |
| 2018/0276663 | A1* | 9/2018 | Arora | G06Q 20/065 |
| 2018/0309567 | A1* | 10/2018 | Wooden | G06F 21/57 |
| 2018/0349994 | A1* | 12/2018 | Kunjachan | G06Q 40/04 |
| 2018/0367316 | A1 | 12/2018 | Cheng et al. | |
| 2019/0158482 | A1* | 5/2019 | Wang | G06F 16/9535 |
| 2019/0266576 | A1* | 8/2019 | McCauley | G06F 21/645 |
| 2019/0268332 | A1* | 8/2019 | Wang | G06F 21/32 |
| 2019/0378098 | A1* | 12/2019 | Lam | G06Q 20/40 |
| 2019/0378119 | A1* | 12/2019 | Hyuga | G06Q 20/0655 |
| 2020/0013055 | A1* | 1/2020 | Sandor | G06Q 20/3674 |
| 2020/0059369 | A1* | 2/2020 | Li | H04L 9/3247 |
| 2020/0118096 | A1* | 4/2020 | Yang | G06Q 20/0658 |
| 2020/0119926 | A1* | 4/2020 | Buki | G06Q 20/065 |
| 2020/0266997 | A1* | 8/2020 | Monica | H04L 63/0478 |
| 2022/0029813 | A1* | 1/2022 | Wakabayashi | H04L 9/3247 |
| 2022/0131845 | A1* | 4/2022 | Gaddam | G06Q 20/24 |
| 2022/0292137 | A1* | 9/2022 | Suh | G06F 16/2246 |

OTHER PUBLICATIONS

BitGo Platform V2 Reference, available online at: https://www.bitgo.com/api/v2/, accessed from internet on Jul. 19, 2019, 238 pages.

"Bips/bip-0032.mediawiki at master", GitHub, available online at: https://github.com/bitcoin/bips/blob/master/bip-0032.mediawiki, Oct. 26, 2018, 16 pages.

"Square/subzero: Square's Bitcoin Cold Storage solution", GitHub, available online at: https://github.com/square/subzero, accessed from internet on Jul. 19, 2019, 2 pages.

Kokalitcheva, "Andreessen Horowitz invests in digital custody startup Anchor Labs", Axios, available online at : https://www.axios.com/andreessen-horowitz-invests-in-in-digital-custody-startup-anchorlabs-c565e0ce-d350-4e09-9936-3809efbc038e.html, Feb. 24, 2018, 12 pages.

Sharma, "What Are Cryptocurrency Custody Solutions?", Investopedia, available online at: https://www.investopedia.com/news/what-are-cryptocurrency-custody-solutions/, Jul. 27, 2018, 7 pages.

* cited by examiner

Authentication Capsule 400

Authentication Policies 402

Encrypted Credentials 404

Device and Application Metadata 406

*FIG. 4*

FEDERATED CUSTODIAN

CROSS-REFERENCE TO RELATED APPLICATIONS

Not applicable.

BACKGROUND

Financial service entities are increasingly offering new asset classes based on cryptocurrencies to their customers. Conventionally, such entities are required to store holdings of customers with a qualified custodian. As opposed to traditional assets, custodianship of cryptocurrency based assets refers to the secure management of private keys. A "custodian" can be a provider such as a third party provider of storage and security services for cryptocurrencies. Conventional custodians may utilize hot and cold wallets. A hot wallet refers to any cryptocurrency wallet that is connected to the internet. Generally hot wallets are easier to set up, access, and accept more cryptocurrencies. However, hot wallets are also more susceptible to hackers, possible regulation, and other technical vulnerabilities. A cold wallet can refer to a cryptocurrency wallet that is not connected to the Internet. Because a cold wallet is not connected to the internet, it is generally more secure than a hot wallet.

However, such conventional systems have several flaws. For example, in conventional custodian systems, authentication of transactions is centralized such that sensitive identity information is stored by a key custodian. By utilizing such an architecture, the conventional system may be more prone to privacy breaches as a given key custodian may learn how much each investment entity (e.g., a bank) manages in terms of its assets. Further, the individuals or organizations who act as key custodians may belong to the same entity, and may therefore be prone to colluding given the large value of some assets.

Another problem that is present with conventional hot and cold wallet systems is that the key custodians are humans that need to transfer data from a hot wallet interface to the cold wallet interface. In some cases, the hot wallet interface may provide a print out of a barcode on paper. The barcode may include information (e.g., transaction information) that needs to be verified on the cold wallet, which may contain certain cryptographic keys for performing verification processes. The key custodian may take the paper and may walk it over to the cold wallet interface and may have the barcode scanned, so that the cold wallet can perform any required verifications. After performing any desired verifications, the cold wallet interface can produce a sheet of paper with a second barcode with the cold wallet's output. The custodian can then take the second paper, and can scan the second barcode at the hot wallet interface to provide the verification result to the appropriate parties or computers in or connected to the hot wallet. This procedure can be cumbersome and inefficient.

Embodiments of the invention address these and other problems, individually and collectively.

SUMMARY

Embodiments of the disclosure include methods and systems for federated custodian systems. Some embodiments of the disclosure include a computer system including: a gateway including a first processor, and a first memory including instructions that, when executed with the processor cause the gateway to: receive, from one or more members of a federated blockchain on a network of computing devices, an approval for a transaction associated with an authentication capsule, the authentication capsule including one or more authentication policies and encrypted credentials, the one or more authentication policies identifying at least a number of the one or more members required to authenticate the transaction for the approval; generate, via a first trusted execution environment implemented by the computer system, a first machine readable code in response to receiving the approval for the transaction, the first machine readable code including encrypted information for the transaction and the approval; and transmit, to a cold interaction system, the first machine readable code; and the cold interaction system comprising one or more processors and one or more memories, the one or more memories comprising instructions executable by the one or more processors to: receive the first machine readable code comprising the encrypted information and the approval; decrypt the encrypted information for the transaction and the approval; generate a first private key that corresponds to a public key for the transaction, the public key maintained by the one or more members of the federated blockchain on the network of computing devices; encrypt the transaction using the first private key; and transmit, to the gateway, a second machine readable code, the second machine readable code verifying completion of the transaction.

In some embodiments, the computer system is further configured to decrypt the second audio machine readable code using a second public key. In some embodiments, the computer system is further configured to transmit to the one or more members of the federated blockchain on the network of computing devices details verifying completion of the transaction. In some embodiments, the one or more members of the federated blockchain on the network of computing devices maintain an audit log of transactions conducted by the one or more members that is updated with details verifying completion of the transaction. In some embodiments, the first machine readable code and the second machine readable code include an audio machine readable code that utilizes audible or inaudible sound frequencies. In some embodiments, the gateway, transaction manager, and the offline server are configured to utilize speakers and microphones for capturing and transmitting audio corresponding to the audio machine readable code.

In some embodiments, the authentication capsule further includes metadata about applications or device data associated with the transaction. In some embodiments, the one or more authentication policies further indicate conditions for approving the transaction via the one or more members of the federated blockchain on the network of computing devices based at least in part on the applications or the device data. In some embodiments, the applications or the device data identify a currency amount associated with the transaction, a geographic location associated with the transaction, or a frequency of previous transactions associated with a member of the one or more members conducting the transaction. In some embodiments, a member of the one or more members signs the transactions as part of authenticating the transaction for approval. In some embodiments, a member of the one or more members generates the public key for the transaction. In some embodiments, the gateway and the cold wallet system are physically separated and not in electrical communication with each other.

Embodiments of the disclosure are further directed to a computer-implemented method including: receiving, by a computer system and from one or more members of a federated blockchain on a network of computing devices, an approval for a transaction associated with an authentication capsule, the authentication capsule including one or more authentication policies and encrypted credentials, the one or more authentication policies identifying at least a number of the one or more members required to authenticate the transaction for the approval; generating, via a first trusted execution environment implemented by the computer system, a first machine readable code in response to receiving the approval for the transaction, the first machine readable code including encrypted information for the transaction and the approval; transmitting, to an offline server, the first machine readable code by presenting the first machine readable code to the offline server; and receiving, from the offline server, a second machine readable code generated by the offline server in a second trusted execution environment, the second machine readable code verifying completion of the transaction, wherein the offline server is configured for: receiving the first machine readable code; verifying proximity of the computer system to the offline server in response to receiving the first machine readable code; decrypting, via a second trusted execution environment implemented by the offline server, the encrypted information for the transaction and the approval in response to verifying proximity of the computer system; requesting, via an associated hardware security module, for generation of a private key that corresponds to a public key for the transaction, the public key maintained by the one or more members of the federated blockchain on the network of computing devices; encrypting, via the second trusted execution environment, the transaction using the private key from the hardware security module; and transmitting, to the computer system, the second machine readable code.

In some embodiments, the computer-implemented method further includes decrypting the second machine readable code using the public key. In some embodiments, the computer-implemented method further includes transmitting to the one or more members of the federated blockchain on the network of computing devices details verifying completion of the transaction. In some embodiments, the one or more members of the federated blockchain on the network of computing devices are configured to maintain an audit log of transactions conducted by the one or more members that is updated with details verifying completion of the transaction. In some embodiments, the authentication capsule further includes metadata about applications or device data associated with the transaction. In some embodiments, the one or more authentication policies further indicate conditions for approving the transaction via the one or more members of the federated blockchain on the network of computing devices based at least in part on the applications or the device data. In some embodiments, the applications or the device data identify a currency amount associated with the transaction, a geographic location associated with the transaction, or a frequency of previous transactions associated with a member of the one or more members conducting the transaction. In some embodiments, a member of the one or more members signs the transactions as part of authenticating the transaction for approval.

Embodiments of the disclosure are further directed to a computer-implemented method including: generating, by a computer system, a first audio machine readable code in response to receiving an approval for a transaction from one or more members of a federated blockchain on a network of computing devices, the first audio machine readable code including encrypted information for the transaction and the approval; and transmitting, to an offline server, the first audio machine readable code by presenting the first audio machine readable code to the offline server, wherein the offline server configured for: receiving the first audio machine readable code; verifying proximity of the computer system to the offline server in response to receiving the first audio machine readable code; decrypting, via a trusted execution environment implemented by the offline server, the encrypted information for the transaction and the approval in response to verifying proximity of the computer system; requesting, via an associated hardware security module, for generation of a private key that corresponds to a public key for the transaction, the public key maintained by the one or more members of the federated blockchain on the network of computing devices; encrypting, via the trusted execution environment, the transaction using the private key from the hardware security module; and transmitting, to the computer system, the second audio machine readable code.

BRIEF DESCRIPTION OF THE DRAWINGS

FIG. 4 shows an example of an authentication capsule;

DETAILED DESCRIPTION

Figure 1:
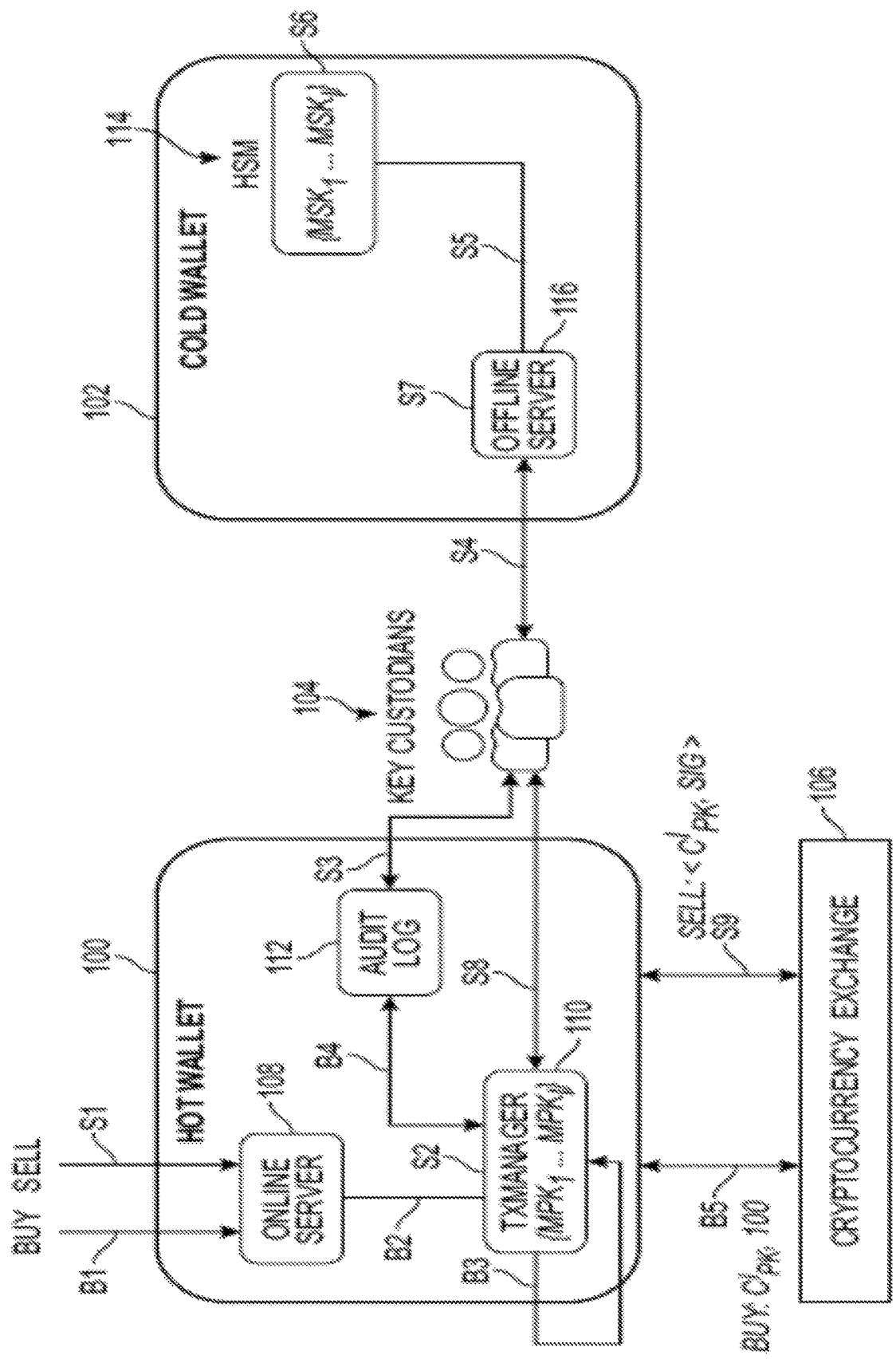
FIG. 1 shows a conventional trusted key custodian architecture system.

Embodiments of the disclosure are directed to methods and systems for federated custodian systems and related activities. The federated custodian systems may be utilized during transactions associated with cryptocurrencies. Although reference may be made to such transactions in the examples below, embodiments are not so limited. That is, the systems, methods, and apparatuses described herein may be utilized for any suitable purpose. Embodiments of the disclosure include a federated interaction system that includes one or more members that utilize a blockchain network to authenticate and authorize transactions. A "member" may include any suitable entity that can be associated with the blockchain network. Examples of members may include investment institutions such as banks, individual, currency trading organizations, etc., and the computers that are operated by them.

By utilizing the federated interaction system, each entity involved in a transaction may maintain or store sensitive information. During a buy or sell phase of cryptocurrency, for example, a member of the federated interaction system may submit an authentication capsule that includes authentication policies, encrypted credentials, and metadata of devices or applications associated with the member. In accordance with at least one embodiment, the authentication policies may identify a number of members of the blockchain integrated federated interaction system that must review and sign data elements associated with the transaction before a transaction is authenticated and authorized. As the federated interaction system utilizes a blockchain network, the details of the transaction are maintained by each member, and are thus less likely to be corrupted by a malicious actor.

During a sell phase, a transaction manager of a gateway associated with an entity conducting the transaction may be selected. The transaction manager of the gateway may be provided with the signatures, transaction information, and the authentication capsule to generate a machine readable code that includes encrypted information for the transaction and the approval from the members of the blockchain network. In some embodiments, custodian(s) associated with the gateway may provide additional signatures required to authorize communication with the a cold interaction system (e.g., a cold wallet). In embodiments, the transaction manager of the gateway may include a computer system or server computer that is configured to interact with the cold interaction system that lacks network connectivity or is otherwise offline. The transaction manager associated with the gateway may be a computer system or server that has a network connection with the federated interaction system but utilizes machine readable codes to interact or communicate with the cold interaction system. The computer system or server computer may transmit or otherwise provide the machine readable code to the cold interaction system, which can decrypt the encrypted information, determine a private key that corresponds to a public key for the transaction, and encrypt and log the details of the approved transaction within the cold interaction system using the private key. In embodiments, the cold interaction system may generate a second machine readable code that is transmitted to the transaction manager associated with the gateway. The transaction manager associated with the gateway may decrypt the second machine readable code and provide details of the transaction back to the members of the blockchain network for recording and maintaining a log of the transaction. In embodiments, the second machine readable code may be decrypted using a corresponding public key. In some embodiments, the details of the transaction (e.g., approval or denial) may be provided to an exchange service provider that is associated with cryptocurrency transactions. In embodiments, the machine readable code may include an audio machine readable code. The audio machine readable code may utilize audible frequencies or inaudible frequencies (e.g., audible frequencies including sound frequencies that can be heard and processed by humans and inaudible frequencies including sound frequencies that can't be heard or processed by humans).

In embodiments, the cold interaction system may maintain and utilize a master secret key and the one or members of the federated interaction system may maintain and utilize a master public key. During buy transactions, as described below with reference to FIG. 2, a member or node of the federated interaction system may receive an authentication capsules that includes authentication policies identifying one or more member signatures required to authorize the transaction. In embodiments, a member or node of the federated interaction system may generate a public child key that corresponds to the buy transaction utilizing the master public key. The information about the member conducting the transaction as well as the generated public child key may be provided to a cryptocurrency exchange that is configured to transfer assets or monetary value to the member or a bank associated with the member. In embodiments, the master public key is generated by the cold wallet using the master secret key. The master public key may be provided to the members of the federated interaction system during an initialization process or it may be communicated by the cold wallet to a member via a machine readable code and a corresponding transaction manager. During a sell phase of a transaction, the cold interaction system may receive a payload or communication from the transaction manager that includes encrypted information where the encryption is based on the master public key, the specific child key associated with the asset being sold, and verification of signatures provided by members of the federated interaction system as indicated by the authentication capsule associated with the transaction. In embodiments, the cold interaction system may decrypt the received encrypted information and determine a child private key that corresponds to the child public key included in the transaction using the master secret key. In embodiments, each gateway and associated transaction manager may be further associated with each member of the federated interaction system to avoid collusion. For example, member one of the federated interaction system may maintain and utilize a server system (transaction manager) that it can communicate with via a network connection such as the internet. The server system may be configured to generate and provide machine readable codes to the cold interaction system absent a network connection to ensure security. Member two of the federated interaction system may maintain and utilize a different server system or computer system (transaction manager) that can communicate with the cold interaction system absent a network connection such as by utilizing machine readable codes.

Embodiments of the disclosure provide several advantages. For example, by utilizing a federated interaction system that is implemented in each entity's network domain (e.g., by being a member of the federated interaction system and utilizing a blockchain network), sensitive identity information remains stored in the entity's domain that manages all appropriate public keys. During a sell phase, the details of the transaction are shared with other members thereby ensuring that each member can keep track of all assets owned by each entity. This can reduce collusion and/or fraudulent activity in the exchange of assets that can result from a single entity authenticating and authorizing transactions on behalf of a particular entity. Moreover, authentication policies may be implemented such that further security benefits are achieved. Each entity or member of the federated interaction system can specify certain requirements to authenticate and can authorize a transaction that will be enforced by the other members of the federated interaction system. Transactions can also be efficiently conducted using embodiments disclosed herein. For example, transactions can be processed more quickly by utilizing machine readable codes that are transmitted from a hot interaction system to a cold interaction system, instead of manually presenting QR codes on a sheet of paper to a cold interaction system (e.g., a cold wallet system). Moreover, in some embodiments, transactions may only be authorized if a computer system associated with a transaction manager conducting the transaction and communication with the cold interaction system is proximate or within a proximate distance to the cold interaction system, and has the appropriate signatures from the members of the federated interaction system. This provides an additional layer of protection from fraudulent transactions or collusion by members of the system, as one or more member signatures or keys may be required to conduct a transaction as indicated by an authentication policy for the transaction. This cannot be overridden by a colluding or malicious member of the system. A proximate distance may include a distance supported by the technology utilized by the transaction manager of a gateway and a corresponding cold interaction system. For example, the proximate distance between the transaction manager of a gateway and a cold interaction system that utilizes speakers and microphones would be the distance supported by the speakers and microphones (e.g., maximum capable distance that sound may be generated and received by corresponding speakers and microphones of the systems).

Prior to discussing embodiments of the invention, description of some terms may be helpful in understanding embodiments of the invention.

A "gateway" may be a computer or cluster of computers that can route data from one computer of a computer cluster to another network of computers. In some embodiments, a gateway may be associated with members of a federated custodian system. An example gateway may include a "fiat gateway" that can be interacted with by a custodian associated with a particular member of the federated custodian system. The gateway may serve as the intermediary between the federated interaction system (e.g., a hot wallet) and a cold interaction system (e.g., a cold wallet). A gateway may include a "transaction manager" that may be a computer or cluster of computers that can route data from one computer of a computer cluster to another network of computers. The transaction manager may be associated with a gateway and may be further configured to communicate with the cold interaction system and federated interaction system by serving as an intermediary.

A "federated interaction system" may be a distributed computer system that can perform interactions and collaboration. In embodiments, a federated interaction system may include collection of computers, which may be operated by members, that use a blockchain. It may include or be characterized as a blockchain network. In some embodiments, the federated interaction system may utilize network communications to enable communications between members of the system and to transmit authentication capsules associated with authenticating a transaction. In embodiments, the federated interaction system may communicate with the computers associated with the gateway as well as with an exchange service for conducting transactions and maintaining records associated with the transactions.

A "blockchain network" as used herein refers to a system that records transactions and maintains such records across several computers or members of the federated interaction system that are linked in a peer-to-peer network.

An "authentication capsule" may be a data structure that includes information utilized by members of the federated interaction system to conduct transactions. In embodiments, the authentication capsule may include authentication policies, encrypted credentials, and device and application metadata.

An "authentication policy" may include one or more specified rules requirements that must be met prior to authenticating a corresponding transaction from a member of the federated interaction system. An example authentication policy may require one or more members (or computers operated by the members) sign a transaction to authenticate the transaction. An authentication policy may increase or decrease the number of signatures or review by other members of the federated interaction system based on details of a transaction (e.g., geographic location, currency amount, etc.), or based on device and application metadata.

"Device and application metadata" may include data associated with a device conducting a transaction. Device and application metadata may refer to data regarding a computing device such as a computer or mobile phone. Examples of device and application metadata may include unique device identifiers for a computer or mobile phone, an IP address, SIM card data, application data, mobile application data, browser data, and device make and model data. Device and application metadata may also include the device's MSISDN, or Mobile Subscriber Integrated Services Digital Network Number, which is a number that uniquely identifies a subscription in a mobile network.

"Encrypted credentials" may include any information of worth or value that may be encrypted. In some embodiments, encrypted credentials may be utilized in conducting a transaction in the federated custodian system that has been made unintelligible to some parties to prevent unauthorized access. The encrypted information may not be read by a recipient without access to a shared secret or access to a designated cryptographic key. As such, the information included in the encrypted credentials may be made unintelligible through a process that is reversible and repeatable such that two entities can share information using a shared secret or cryptographic keys (e.g., encryption keys) without unauthorized entities being able to understand or gain access to the sensitive information that has been encrypted.

A "public/private key pair" may include a pair of linked cryptographic keys generated by an entity or entities. The public key may be used for public functions such as encrypting a message or data to send to an entity or for verifying a digital signature which was supposedly made by an entity. The private key, on the other hand may be used for private functions such as decrypting a received message or information or applying a digital signature.

A "signature" may refer to the result of applying an algorithm which allows a signing party to manifest, and a verifying party to verify, the authenticity and integrity of a document, data, or information. For example, for a public/private key pair, the signing party may act by means of the private key and the verifying party may act by means of the public key. A signature may be referred to as a digital signature.

A "trusted execution environment" may include a secure area inside a processor. The trusted execution environment may run in parallel of an operating system in an isolated environment. Certain applications running in a trusted execution environment have access to the full capabilities of a device's processor and memory whereas hardware isolation protects the same components from being utilized by other applications.

A "machine readable code" may include suitable data that may be read and processed by a machine or computer. A machine readable code can include any format that can store data and be read by a mechanical device. An example of a machine readable code may include an audio machine readable code. Another example of a machine readable code may include a light machine readable code or an optical machine readable code. Encrypted information of a transaction and an approval of the transaction may be converted into a machine readable code that is further transmitted to a cold interaction system of the federated custodian system described herein.

A "cold interaction system" may include a computer system(s) that is not connected to a network such as the Internet. An example cold interaction system may include a hardware security module, a trusted execution environment, and an offline server. In embodiments, the cold interaction system may include a speaker and microphone or other components such as optical components, and scanners for receiving, processing, and transmitting machine readable codes.

An "audit log" may include records of interactions. In some embodiments, an audit log can includes records maintained by the members of the federated interaction system associated with transactions conducted by the members and maintained via a blockchain network.

A "hardware security module" may include a physical computing device that manages digital keys for authentication and crypto-processing. In some embodiments, a hardware security module of the cold interaction system may generate private keys for sale transactions conducted using the federated custodian system described herein.

An "exchange service provider" may include a system or website configured to enable users to buy, sell, or exchange cryptocurrencies. In embodiments, an exchange service provider may be provided information by the federated custodian system upon completion of a buy or sale transaction by a member of the federated interaction system.

A "server computer" may typically be a powerful computer or cluster of computers. For example, the server computer can be a large mainframe, a minicomputer cluster, or a group of servers functioning as a unit. In one example, a server computer may be a database server coupled to a Web server. The server computer may be associated with an entity such as a merchant, payment processing network, a wallet provider, a merchant, an authentication cloud, an acquirer, or an issuer.

A "computing device" may be any suitable electronic device that can process and communicate information to other electronic devices. The computing device may include a processor and a computer readable medium coupled to the processor, the computer readable medium comprising code, executable by the processor. The computing device may also each include an external communication interface for communicating with each other and other entities. A mobile device, a cardholder device, a consumer device, and a server computing device may be exemplary types of computing devices.

FIG. 1 shows a conventional trusted key custodian architecture system. FIG. 1 shows a hot wallet 100, a cold wallet 102, key custodians 104, and a cryptocurrency exchange 106. In embodiments, the hot wallet 100 may include an online server 108, a transaction manager 110, and an audit log 112. In embodiments, the cold wallet 102 may include a hardware security module 114 and an offline server 116. The components of FIG. 1 illustrate a conventional trusted key custodian architecture that is implemented by entities that manage cryptocurrencies on behalf of users.

As illustrated in FIG. 1 and further explained below with reference to the buy and sell phases depicted in FIG. 1, authentication is centralized in the hot wallet 100. The key custodians 104 may be humans and may all belong to the same entity. The transaction manager 100 may be software running on the hot wallet 100 and may know how many assets are held by each party to the transaction. The interaction between the hot wallet 100 and cold wallet 102 requires manual intervention by the key custodians 104.

As explained above, the conventional trusted key custodian architecture depicted in FIG. 1 has several problems. For example, in the system in FIG. 1, authentication is centralized in the hot wallet 100 such that sensitive identity information is stored by a key custodians 104 or the transaction manager 110. One or more of the key custodians 104 may also learn how much each member manages in terms of assets including cryptocurrency. The key custodians 104 may collude as they may belong to the same entity. The manual intervention by the key custodians 104 and the cold wallet 102 is also inefficient, and may be prone to user error.

FIG. 1 depicts two phases associated with assets (cryptocurrency) managed by the trusted key custodian architecture: a buy phase indicated by steps B1-B5 and a sell phase indicated by steps S1-S9.

In step B1, an entity (not pictured) such as a bank initiates a buy transaction and authenticates to a key custodian (not pictured) in the hot wallet 100 by interacting with an online server 108.

In step B2, the key custodian, via the online server 108, authorizes the transaction by verifying the funds through traditional channels and invokes the transaction manager 110 to continue the buy process.

In step B3 the transaction manager 110 generates a new public key ($C_{pk}^i$), which may be referred to as a "child public key," since it is derived from a master public key (mpk):

$$C_{pk}^i = mpk_1 + \underbrace{hash(i, mpk_1)P}_{P \text{ is a generator of } G}$$

In embodiments, the public key may be generated utilizing Elliptic Curve Cryptography (ECC), where the public key is a point (i.e., a paired x, y coordinate) on an elliptic curve over a finite field that is part of a cyclic subgroup. In embodiments, an elliptic curve is a set of points described by the following equation:

$$y^2=x^3+ax+b$$

A finite field is a set with a finite number of elements. An elliptic curve over a finite field is, broadly speaking, an elliptic curve where x and y can only take on a finite number of values. Generally, a subgroup is a group contained within another group. If a group is a collection of points corresponding to the elliptic curve over a finite field, a subgroup is a smaller collection of those points. A cyclic subgroup is a subgroup that can be cycled through. That is, it is possible to "move" from one point to the next, eventually returning back to the first point, a process which can be repeated indefinitely. A clock is a useful analogy, as the hands of a clock rotate from 12 back to 12, and repeat. In ECC, the public key is a point that is part of a subgroup of points in an elliptic curve over a finite field, and the subgroup of points are cyclic. In ECC, the private key is an integer chosen from $\{1, \ldots, p-1\}$, where p is the order of the cyclic subgroup, and is typically prime (i.e., p is the prime order of the subgroup G). The order of a group or subgroup is the number of elements in the group or subgroup. In this case, p is the number of points in the subgroup containing the public key.

In embodiments, the public key and private key relate by the formula:

$$\text{Public Key}=\text{Private Key}*\text{Generator}$$

The generator (or "base point") is a point that can be used to generate the subgroup. That is, multiplying the generator by a number from $\{1, \ldots, p-1\}$ generates the corresponding point in the subgroup. Note that this is not scalar multiplication, and adheres to the rules of the finite field. ECC is secure because there is no known method of recovering the private key given the public key and the generator.

In step B3, the transaction manager 110 generates a child public key C_pk^i, which corresponds to a child secret key C_sk^i. Data encrypted with the child public key can be decrypted with the child secret key, and vis versa. The child public key may be a point on an elliptic curve over a finite field that belongs to a cyclic subgroup. The child public key may be derived from a master public key. The master public key likewise may be a point on an elliptic curve over a finite field that belongs to a cyclic subgroup. The child public key may be derived from the master public key and a generator P according to the following formula:

$$C_{pk}^i = mpk_1 + \underline{hash(i, mpk_1)P}$$
$$\text{\scriptsize P is a generator of G}$$

A hash function produces an output of fixed data size from an input (in this case, a number i and the master public key). This output is a number and is consistent (i.e., provided the inputs stay the same, the outputs stay the same). Because P is a generator of G (the cyclic subgroup to which the public keys belong), the product hash (i, $mpk_1$)P is a point that is a member of the cyclic subgroup G. The child public key (a point) is the sum of the master public key (a point) and the product hash(i, $mpk_1$)P (yet another point). Both the master public key and the product hash(i, $mpk_1$)P are members of the cyclic subgroup G. By the properties of cyclic subgroups, this means that the child public key is also a member of G. As an analogy, consider a clock. 7:00 (7 hours after 12:00) plus 8:00 (8 hours after 12:00) is 3:00 due to the cyclic nature of the clock. Likewise, the addition of the master private key and hash(i, $mpk_1$)P is within the cyclic subgroup due to its cyclic nature.

In step B4, the transaction manager 110 records the intention of the buy of the asset in the audit log 112.

In step B5, the transaction manager 110 communicates with the cryptocurrency exchange 106 to buy the cryptocurrency, thereby completing the buy phase.

In the sell phase, an entity (not pictured) and a key custodian 104 interacts with the hot wallet 100 and cold wallet 102 to sell assets.

In S1, the entity (e.g., the bank) initiates a sell transaction and authenticates to the key custodian of the hot wallet 100 (not shown) via online server 108. The key custodian, via online server 108, authorizes the entity and invokes the transaction manager 110.

In S2, the transaction manager 110 records the sell intent of the entity of the asset in the audit log 112.

In S3, the key custodians 104 start the process of approving the transaction (sale of assets) by signing using their private key(s) which may be held by their individual computer systems.

In S4, a cold wallet administrator (e.g., a key custodian of the key custodians 104) collects the multiple signatures from the key custodians 104, and physically interacts with the cold wallet 102 by interacting with the offline server 116 in the cold wallet 102. In embodiments, the cold wallet administrator may present a QR code to a data bearing medium such as a sheet of paper, which is interpreted by the offline server 116.

In S5, the offline server 116 verifies all the signatures from the key custodians 104 and requests that the hardware security module 114 generate the corresponding child private key $C_{sk}^i$.

In S6, the hardware security module 114 generates the child private key $C_{sk}^i$ using the master secret key ($msk_1$):

$C_{sk}^i = msk_1 + hash(i, mpk_1) \bmod p$./p is prime order of G

In step S6, the hardware security module 114 generates the child private key $C_{sk}^i$ using the master secret key ($msk_1$), according to the following formula:

$C_{sk}^i = msk_1 + hash(i, mpk_1) \bmod p$./p is prime order of G

As a reminder, in ECC, the secret key is a integer that relates to the public key via a generator. The secret key is chosen from $\{1, \ldots, p-1\}$, where p is the prime order of the cyclic subgroup G. The mod function is effectively the remainder following division. That is, A mod p is the remainder after dividing A by p. 40 mod 12, for example, is 4, as 40/12=3 with remainder 4. Notably, A mod p must be less than p. This results from the fact that modulus is the remainder. If the remainder was greater than the divisor p, it is possible to further divide A. Thus because p is the prime order of G, and because A mod p must be less than p (i.e., less than or equal to hash(i,$mpk_1$)mod p) is a valid secret key because it is in the set $\{0, \ldots, p-1\}$. The child secret key is then the master secret key offset by adding hash(i, $mpk_1$)mod p, which is itself a valid secret key. The child secret key and the child public key have the same relationship that the master secret key and master public key do. That is, the child secret key relates to the child public key by the generator P:

$$C_{pk}^i = C_{sk}^i P$$

Notably, because the hash function is consistent, the hash term hash(i, $mpk_1$) is equal in both formulas. In the public key formula, the hash term is used to "move" through the cyclic subgroup, starting at the master public key point until the child public key point is reached. In the secret key formula, the hash term is used to "move" through the set $\{1, \ldots, p-1\}$ starting at the master secret key, and advancing $$\underline{hash(i, mpk_1) \bmod p}$$
$$\text{\scriptsize p is a prime order of G}$$

elements to the child secret key. The child secret key is the integer that corresponds to the child public key according to the formula above.

In S7, the offline server 116 confirms the transaction and prints the transaction details on paper. The transaction details may be in the form of a QR code.

In S8, the hot wallet administrator invokes the transaction manager 110 by inputting the QR coded transaction details from the offline server 116.

In S9, the hot wallet 100 executes the transaction by submitting the order to the cryptocurrency exchange 106, and settles the transaction in fiat currency using traditional payment network processes.

Figure 2:
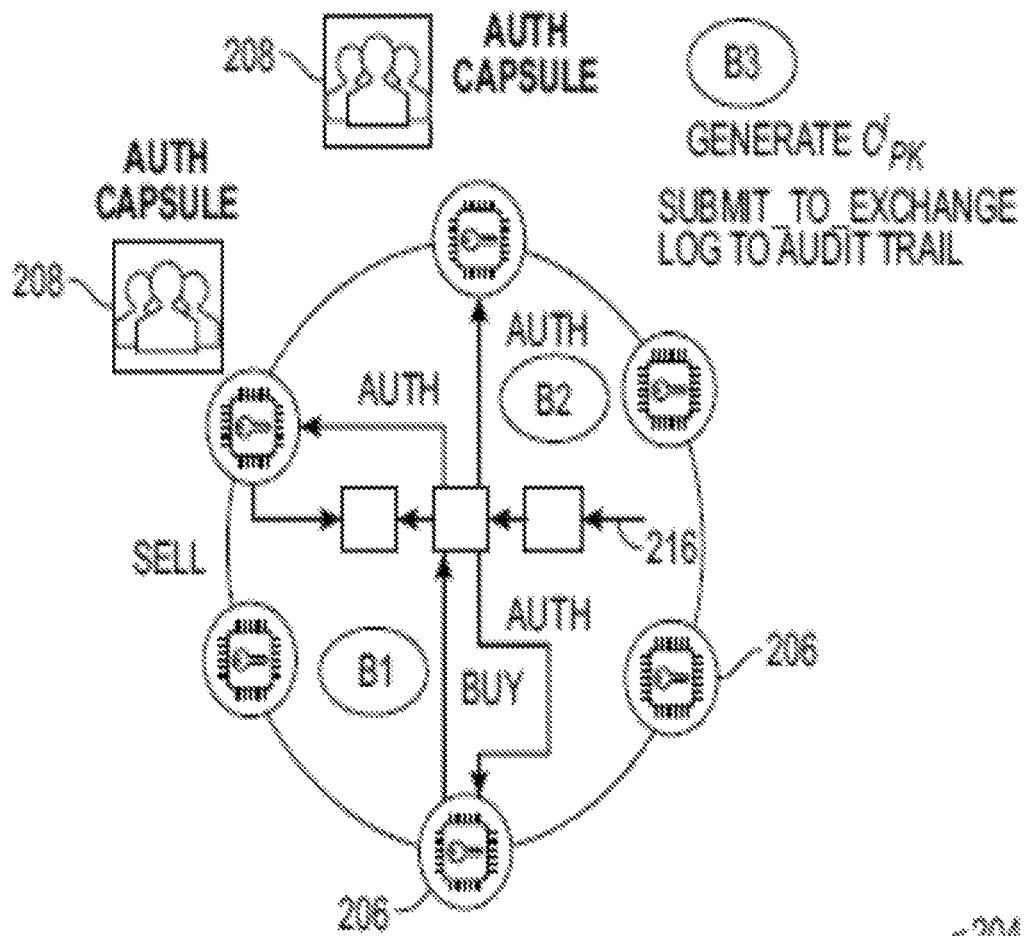
FIG. 2 shows an example of a federated interaction system component of a federated key custodian system according to an embodiment of the disclosure.
Figure 2:
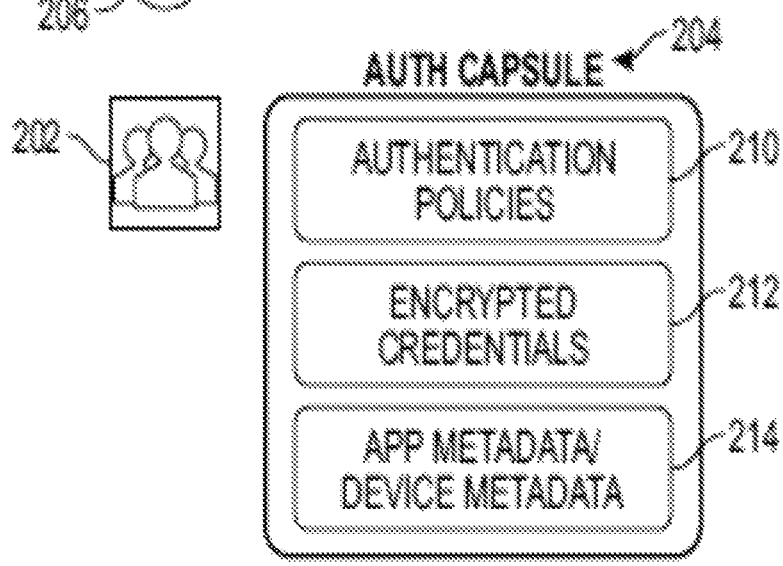

FIG. 2 shows an example federated interaction system 200 (which may be characterized as a federated key custodian system in some instances) according to an embodiment of the disclosure. The federated interaction system 200 illustrated in FIG. 2 along with the cold interaction system (depicted in FIG. 3 below) depict an architecture that solves the problems enumerated above with respect to the conventional trusted key custodian architecture of FIG. 1. The federated interaction system 200 improves on the conventional custodian system by utilizing a hot wallet in each member's network domain, thereby causing sensitive identity information to remain stored in each entity's domain. The hot wallet can also manage all public keys that are needed to conduct transactions with the hot wallet. With the use of the federated interaction system 200 during the sell phase, public keys need to be shared with a key custodian to compute private keys. As a result, a key custodian may keep track of all the assets owned by each entity. Further, through the use of the blockchain network in the federated interaction system 200, each transaction may be recorded and provided to each member, such that the likelihood of collusion and tampering during a transaction is reduced. Instead of having a select few key custodians that all belong to the same entity authorizing transactions and conducting the transactions, all members of the federated interaction system can authenticate, authorize, and maintain records associated with a transaction. In some embodiments, the blockchain network based governance of the federated interaction system 200 may require the selection of a group of key custodians from the members of the federated interaction system 200. These key custodians can approve transactions in the federated interaction system, as opposed to the key custodians being from a single entity.

FIG. 2 depicts a member 202, submitting a transaction during a buy phase as indicated by steps B1-B3. FIG. 2 includes an authentication capsule 204, and nodes 206 that may comprise signatures or cryptographic keys provided by members 208 of the federated interaction system 200. The member 202 may be an example of the members 208 and depicted in FIG. 2 as conducting a transaction. The authentication capsule 204 may include information such as authentication policies 210, encrypted credentials 212, and device and application metadata 214.

In step B1, an administrator (e.g., an employee) or other user associated with a member 202 (e.g., a bank, individual, etc.) wishing to conduct a transaction may submit an authentication capsule 204 to the federated interaction system 200 including the computers operated by its members 208 to buy assets. For example, a member may be a bank that wants to buy assets such as a cryptocurrency such as Etherium.

In step B2, any number of members 208 (or their computers) of the federated interaction system 200 may receive the authentication capsule 204 for the transaction of member 202 and enforce the authentication policies 210 included in the authentication capsule 204. For example, the authentication policies 210 may indicate that at least two other members 208 of the federated interaction system 200 and the administrator of the member 202 must authorize and sign the transaction. The signatures may be provided to members 208 to verify proof of enforcement of the authentication policy 210 associated with the transaction.

In step B3, any member 208 of the federated interaction system 200 may receive the proof of enforcement of the authentication policies from the other members 208 and verify the proof. Any member 208 may also compute a child public key ($C_{pk}{}^i$). Verifying proof of enforcement of the authentication policies may include verifying that a correct number of signatures have been provided by members 208 of the federated interaction system 200. In embodiments, the record of the transaction is provided to the audit log (not shown in FIG. 2) which includes the records maintained by the blockchain network of the federated interaction system 200. The details of the transaction may be transmitted to a cryptocurrency exchange provider. In embodiments, the cryptocurrency exchange provider may be configured to transfer the funds or assets of the transaction to the appropriate entity or member 208 of the federated interaction system 200.

Figure 3:
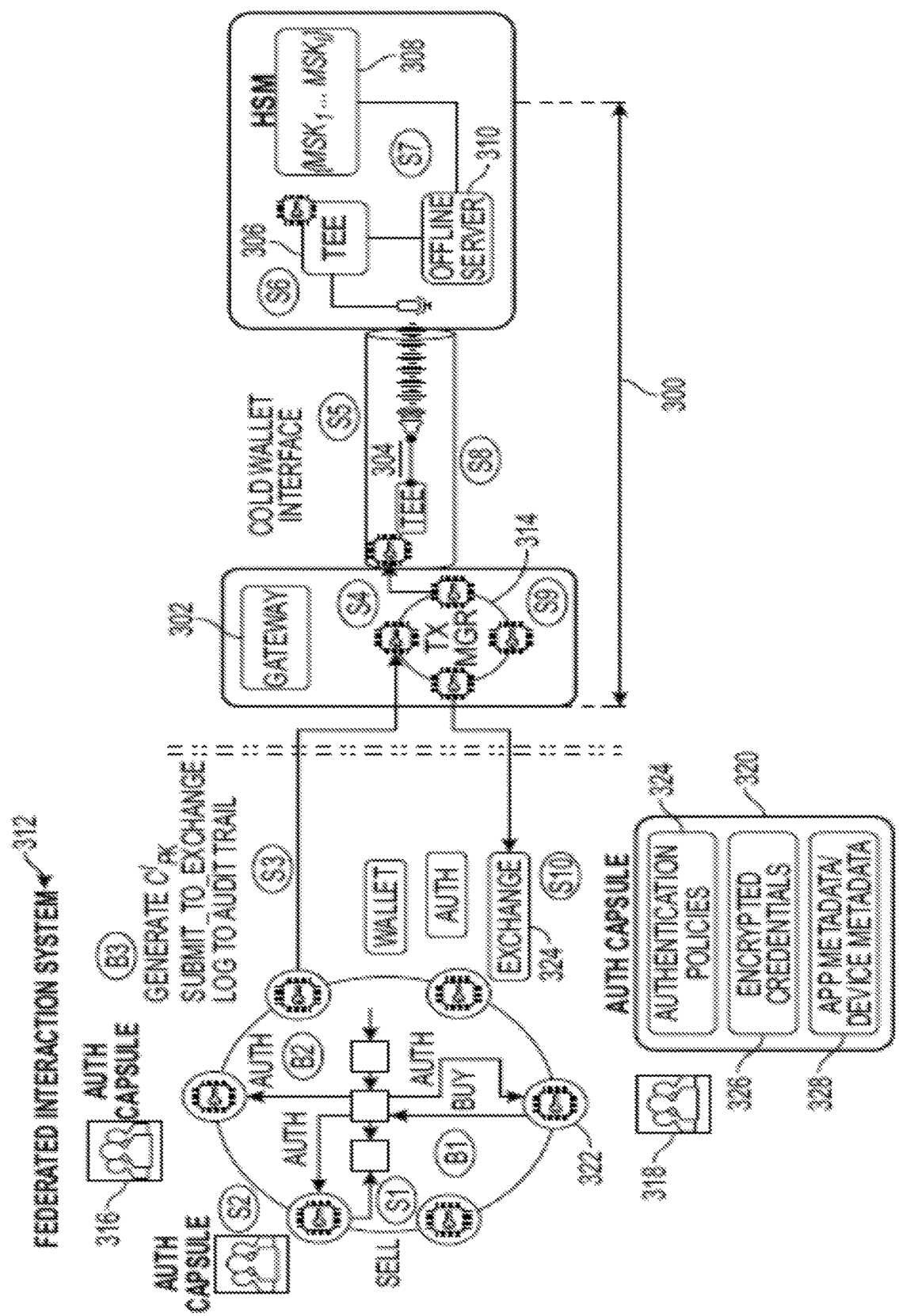
FIG. 3 shows an example of a federated interaction system component and a cold interaction system component of a federated key custodian system according to an embodiment of the disclosure.

FIG. 3 shows an example a federated interaction system component and cold interaction system component of a federated interaction system according to an embodiment of the disclosure. FIG. 3 includes a cold interaction system 300 that includes gateway 302, first trusted execution environment 304, second trusted execution environment 306, hardware security module 308, and offline server 310. The first trusted execution environment 304 and second trusted execution environment 306 may be physically separated from each other. The cold interaction system 300 may communicate, via the gateway 302 comprised of administrators from a centralized key custodian entity, with the federated interaction system 312 using machine readable codes. For example, a sound based channel may be utilized by the federated key custodian system such that a transaction may only be processed when the computer system associated with the transaction manager 314 is in physical proximity of the offline server 310 and has the appropriate keys or signatures 314. By utilizing machine readable codes, the interaction between the federated interaction system 312 and the cold interaction system 300 are more efficient and secure as the transactions are processed upon inferring the distance between the transaction manager 314 associated with the centralized key custodian entity of the gateway 302 and the offline server 310. Further, by using sound as a data transmission medium between the federated interaction system 312 and the cold interaction system, it is more difficult for an unauthorized person to hack into the cold interaction system 300, thereby preserving data security. Information about the transaction such as the specific signatures provided by members 316 may be included in the machine readable code. The federated interaction system 312 may be an example of the federated interaction system 200 of FIG. 2.

Various entities in FIGS. 2-3 may communicate through any suitable communication channel or communications network. A suitable communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

FIG. 3 depicts a member 318 of members 316, submitting a transaction during a sell phase as indicated by steps S1-S10. FIG. 3 includes an authentication capsule 320, and signatures or keys 322 provided by members 316 of the federated interaction system 312. The authentication capsule 320 may include information such as authentication policies 324, encrypted credentials 326, and device and application metadata 328. During a sell phase of a transaction using the federated interaction system 312, gateway 302, and cold interaction system 300, the centralized key custodian of the gateway 302 may populate the transaction by computing a private key. A group of administrators from the centralized key custodian of the gateway 302 may use a machine readable code, such as an audio QR transmitted via a sound based channel, that may be transmitted to and from the offline server 310 to process the sell phase transaction.

In step S1, an administrator or other user associated with member 318 wishing to conduct a transaction may submit an authentication capsule, such as authentication capsule 320, to the federated interaction system 312 and the members 316 to sell assets.

In S2, any number of members 316 of the federated interaction system 312 may receive the authentication capsule 320 for the transaction of member 318 and enforce the authentication policies 324 included in the authentication capsule 320. For example, the authentication policies 324 may indicate a certain number of members 316 must authorize and sign the transaction based on an amount of the transaction. The signatures 322 may be provided to a specific member 316 for verifying proof of enforcement of the authentication policy 324 associated with the transaction.

The specific members 316 of the federated interaction system 312 may sign the transaction using a key pair that is maintained by the member 316 themselves.

In S3, any member of the members 316 of the federated interaction system 312 may receive proof of enforcement of the authentication policies 324 from the other members 316, verify the proof, and communicates with the transaction manager hosted by the key custodians of gateway 302. Verifying proof of enforcement of the authentication policies may include verifying a correct number of signatures have been provided by members 316 of the federated interaction system 312.

In S4, the gateway 302 approves the communication with cold interaction system 300 and offline server 310. Approval of the transaction may include additional signatures 322 provided by key custodians of gateway 302. In embodiments, key custodians associated with gateway 302 may provide additional signatures using their own keys. For example, certain authentication policies 324 may require that key custodians provide signatures to approve a transaction and communicate with the cold interaction system 300 and offline server 310. Some authentication policies 324 may indicate that signatures are required to be provided by key custodians of the gateway 302 based on an amount of assets included in the transaction (e.g., when an amount of currency or assets exceeds a threshold amount).

In S5, the gateway 302 encodes a cryptogram of the transaction details as well as the authentication by members 316 of the federated interaction system 312 and key custodians of gateway 302 as a machine readable code such as an audio QR (as depicted in FIG. 3 as an audio signal). The transaction details may include an amount of assets included in the transaction, the public key associated with the transaction, and signatures provided by members 316 of the federated interaction system 312. In embodiments where key custodian signatures are required, the encrypted information may include the signatures provided by the key custodians. Encryption may include utilizing the following formula: enc ($PK_{enc}$, $<C_{pk}^i, \sigma_{enc}>$). In embodiments, the gateway 302 or associated transaction manager may utilize a first trusted execution environment 304 to generate the machine readable code that includes the encrypted information. The machine readable code may be transmitted by the gateway 302 to the cold interaction system 300 and second trusted execution environment 306.

In S6, the second trusted execution environment 306 of the cold interaction system 300 obtains, records, or otherwise processes the received machine readable code, verifies proximity of the gateway 302 that transmitted the machine readable code, and decrypts the encrypted cryptogram generated by the gateway 302 and first trusted execution environment 304. The offline server 310 may decrypt the encrypted machine readable code and request that the hardware security module 308 generate or determine the child private key ($C_{sk}^i$) corresponding to the child public key ($C_{pk}^i$) for the transaction. In embodiments, verifying proximity of the transaction manager 314 or the computer system associated with the transaction manager may include mapping a portion of the data received via a particular medium to a threshold amount of data nominally received according to the mediums capabilities where the medium corresponds to the type of technology utilized to provide and receive the machine readable codes. In other embodiment, signal strength can be a test of how proximate a device is to another device. In embodiments, the second trusted execution environment 306 may decrypt the encrypted cryptogram generated by the gateway 302 (first machine readable code) using the private key that corresponds to the master public key. The hardware security module 308 may generate or determine the child private key ($C_{sk}^i$) using the master secret key maintained by the cold interaction system 300.

In S7, the hardware security module 308 generates the child private key ($C_{sk}^i$) and sends the private key to the second trusted execution environment 306 and offline server 310.

In S8, the offline server 310 encrypts the approval or denial of the transaction using the child private key and generates a machine readable code (a second machine readable code) that can be transmitted back to the gateway 302. In embodiments, the second machine readable code may be encrypted using a private key that corresponds to the master public key. In embodiments, the use of a machine readable code to communicate between the gateway 302 and the offline server 310 provides many advantages to the conventional method of a human interacting with a cold wallet system with a paper QR code. For example, by using a computer system, such as gateway 302, configured to utilize machine readable codes (second machine readable codes) the offline server 310 of the cold wallet and gateway 302 can receive and process hundreds of transaction per minute versus the singular transaction per minutes conducted by the human using the paper QR code. Moreover, collusion and security benefits are gained as the machine readable codes are generated by the gateway 302 and communicated to the offline server 310 such that interception let alone interpretation of the information included in the machine readable code is undecipherable without the appropriate keys to decrypt the encrypted information included in the machine readable code.

In S9, the gateway 302 decrypts the payload included in the second machine readable code using the public key associated with the transaction. In embodiments, the gateway 302 may request that custodians confirm or verify the transaction based on authentication policies associated with the transaction and included in the authentication capsule 320. Upon decrypting the payload included in the second machine readable code details of the transaction are provided to the members 316 of the federated interaction system 312.

In S10, the first trusted execution environment 304 sends the details of the transaction to the exchange service provider 324. The cryptocurrency exchange 106 of FIG. 1 may be an example of an exchange service provider 324. In embodiments, the cryptocurrency exchange 106 is configured to transfer funds or assets, such as bitcoins, to the appropriate entity or member 316 associated with the transaction in response to an instruction from the first trusted execution environment 304 of the gateway 302. The first trusted execution environment may verify the proof, decrypt the transaction, and send the details of the transaction to the exchange service provider 324.

FIG. 4 shows an example authentication capsule. Authentication capsule 400 of FIG. 4 may include authentication policies 402, encrypted credentials 404, and device and application metadata 406. The authentication capsule 400 of FIG. 4 may be an example of authentication capsules 204 and 320 of FIGS. 2 and 3. Device and application metadata 406 may also be referred to as application metadata and device metadata in FIGS. 2 and 3.

The authentication capsule 400 may be configured by entities or members of the federated key custodian system and submitted by said entities for conducting a transaction such as buying or selling of assets. The entities may specify the requirements that must be met as indicated in the authentication policies 402, the information included in the encrypted credentials 404, and the device and application metadata 406. As described herein, the authentication policies 402 may specify conditions which must be met for a transaction to be authenticated and authorized by members of the federated key custodian system. In embodiments, the authentication policies 402 may indicate several threshold number of members that must sign or provide a key for a transaction based on the details of the transaction that are included in the encrypted credentials.

For example, for transactions originating from certain geographic locations, a first number of members may be specified in the authentication policies for signing the transaction to authenticate and authorize the transaction. As another example, a certain amount of currency at issue in a given transaction may utilize an authentication policy 402 that indicates that the device and application metadata 406 be analyzed by members as well as signed by a certain number of members of the federated key custodian system. In embodiments, the encrypted credentials could include information about the transaction such as the amount of assets or the type of assets that are to be bought or sold, user demographics such as an identity of the entity in the transaction, geographic information, address information, and payment credentials for transferring of funds to complete a transaction using the exchange provider.

Figure 5:
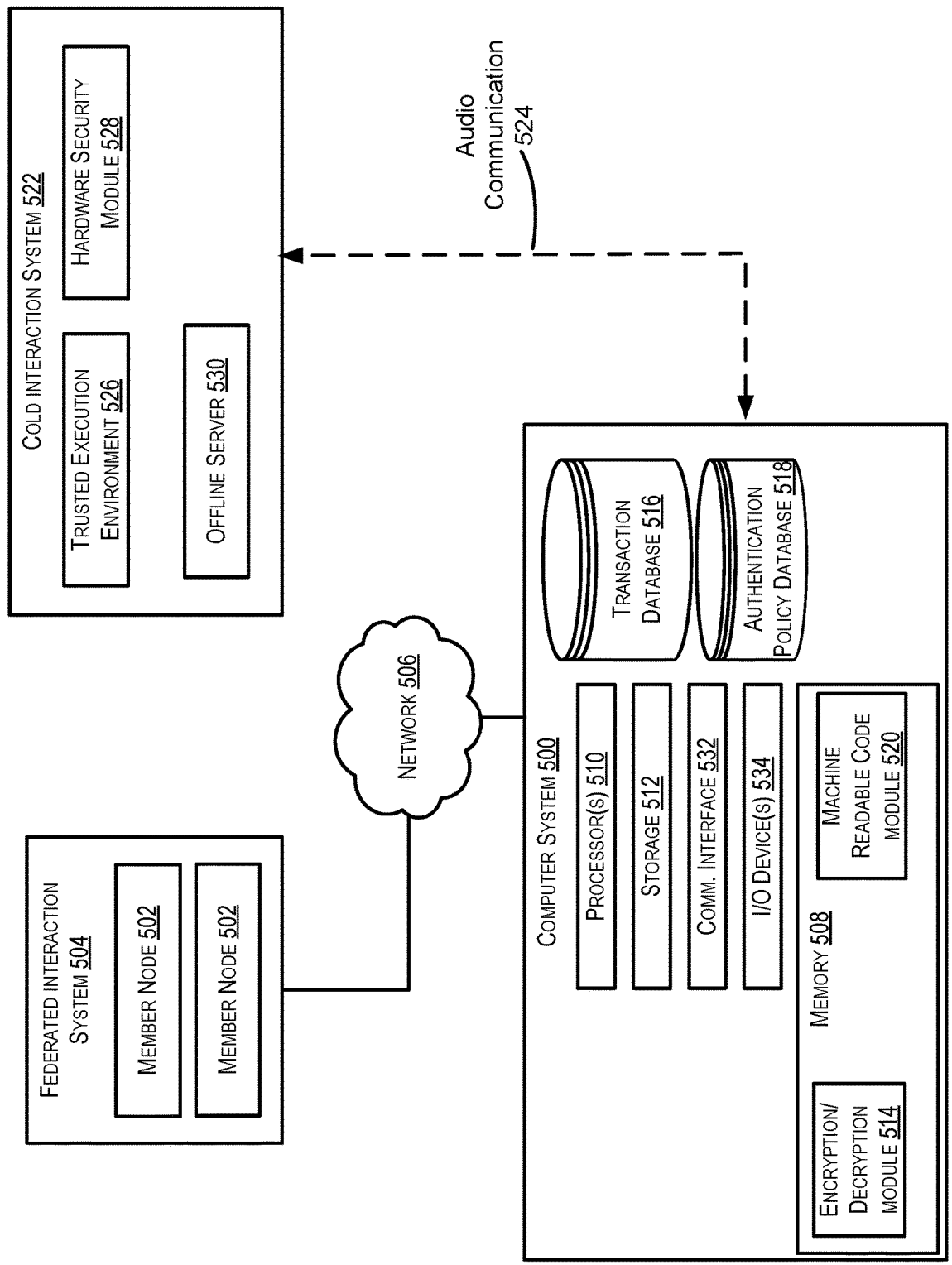
FIG. 5 shows a block diagram of a federated key custodian system according to an embodiment of the disclosure.

FIG. 5 shows a block diagram of a federated key custodian system according to an embodiment of the disclosure. In embodiments, a computer system 500 of a gateway may be in communication with one or more computer systems associated with member nodes 502 of the federated interaction system 504 via a network connection 506. In some embodiments, the computer system 500 may be an example of computer of a group of custodians of gateway 302 of FIG. 3.

In embodiments, the computer system 500 may include at least one memory 508 and one or more processing units (or processor(s)) 510. The processor(s) 510 may be implemented as appropriate in hardware, computer-executable instructions, firmware, or combinations thereof. Computer-executable instruction of firmware embodiments of the processor(s) 510 may include computer-executable or machine executable instructions written in any suitable programming language to perform the various functions described.

The memory 508 may store program instructions that are loadable and executable on the processor(s) 510, as well as data generated during the execution of these programs. Depending on the configuration and type of computer system 500, the memory 508 may be volatile (such as random access memory (RAM)) and/or non-volatile (such as read-only memory (ROM), flash memory, etc.). The computer system 500 may also include additional storage 512, such as either removable storage or non-removable storage including, but not limited to, magnetic storage, optical disks, and/or tape storage. The disk drives and their associated computer-readable media may provide non-volatile storage of computer-readable instructions, data structures, program modules, and other data from the computer system 500. In some embodiments, the memory 508 may include multiple different types of memory, such as static random access memory (SRAM), dynamic random access memory (DRAM) or ROM.

Turning to the contents of memory 508 in more detail, the memory 508 may include an operating system and one or more application programs or services for implementing the features disclosed herein including at least a module for encrypting/decrypting details of a transaction and approval by members of a federated interaction system as well as key custodians (encryption/decryption module 514) using data from the transaction database 516 and authentication policy database 518, and a module for generating and interpreting machine readable codes (machine readable code module 520) such as audio QR codes. In embodiments, the computer system 500, processor 510, and memory 508 may be implemented within a first trusted execution environment (not pictured). In embodiments, authentication policies specified by entities may be stored in the authentication policy database 518 for verifying conformance to the requirements of a given authentication policy.

In some embodiments, the encryption/decryption module 514 in conjunction with processor 510 may be configured to receive and process signatures or authentication from member nodes 502 of the federated interaction system 504 as well as transaction details or encrypted information from an entity conducting a transaction. The encryption/decryption module 514 in conjunction with processor 510 may be configured to verify conformance of the authentication policies included in an authentication capsule from a member or entity conducting a transaction by verifying a number of signatures or keys provided by member nodes 502. In embodiments, the encryption/decryption module 514 in conjunction with processor 510 may be configured to add signatures from key custodians associated with computer system 500 verifying proof of adherence to the authentication policy requirements of an authentication capsule.

In embodiments, the federated key custodian system depicted in FIG. 5 includes a cold interaction system 522 that is physically separated and not in electrical communication with the computer system 500. As depicted in FIG. 5, the computer system 500 may communicate via audio communication 524 using audio QR codes or other machine readable mediums such as computer readable optical codes or any suitable computer readable code. The cold interaction system 522 may include a trusted execution environment 526 (which may be referred to as a second trusted execution environment), a hardware security module 528, and an offline server 530. In embodiments, the trusted execution environment 526 in conjunction with processors of the offline server 530 may be configured to verify proximity of the computer system 500 providing the machine readable code and decrypt the encrypted cryptogram included in the machine readable code. In embodiments, the trusted execution environment 526 and offline server 530 may instruct the hardware security module 528 to generate a private key that corresponds to the public key for the transaction. In embodiments, the offline server 530 may maintain the record of the transaction and the mapping of the keys in the hardware security module 528. In embodiments, the offline server 530 may be configured to encrypts the approval or denial of the transaction using the private key generated by the hardware security module 528 and generate a second machine readable code. The second machine readable code may be transmitted or otherwise provided to the computer system 500.

In some embodiments, the machine readable code module 520 in conjunction with processor 510 may be configured to generate a machine readable code that includes encrypted information such as the approval of the member nodes 502 of the federated interaction system 504, the approval or signatures of the key custodians associated with computer system 500, and details of the transaction (e.g., buy, sell, currency, geographic location, etc.). The inclusion of the appropriate signatures (e.g., by members of the federated interaction system and in some cases the key custodians) is required to communicate with the cold wallet interface and conduct a transaction. The transaction details themselves such as the assets being sold and the associated child public key are required in the information payload represented by the encrypted machine readable code so that an appropriate child private key can be identified by the cold interaction system to complete the transaction. Encryption may include utilizing the following formula: enc ($PK_{enc}$, $<C_{pk}^{i}, \sigma_{enc}>$). The inputs for the formula correspond to an encryption of a payload of information from the gateway (e.g., 302) to the cold wallet interface or cold wallet system during a sell phase of a transaction as described in FIG. 3. The $PK_{enc}$ variable may include the public key encryption performed using a public key associated with the cold wallet and associated with a cold wallet public-private key pair where the public key is provided to the members of the federated interaction system or hot wallet. In embodiments, the variables $<C_{pk}^{i}, \sigma_{enc}>$ of the encoding encryption formula above may include a payload of information that includes details of the transactions that are encrypted using a public key associated with the assets associated with the transaction as well as the proof of verification to communicate with the cold wallet system (e.g., signature(s) provided by members or nodes of the federated interaction system that correspond to the authentication policies included in the authentication capsule associated with the transaction). In embodiments, the computer system 500 may implement a first trusted execution environment to generate the machine readable code that includes the encrypted information via the machine readable code module 520.

The computer system 500 may also contain communication interface(s) 532 that enable the computer system 500 to communicate with a stored database, another computing device or server, one or more remote devices, other application servers, and/or any other suitable electronic devices. In some embodiments, the communication interface 532 may enable the computer system 500 to communicate with other electronic devices on a network (e.g., on a private network) or with member nodes 502 of the federated interaction system 504 as well as exchange service providers via network 506. The processor computer 300 may also include input/output (I/O) device(s) and/or ports 534, such as for enabling connection with a keyboard, a mouse, a pen, a voice input device, a touch input device, a display, speakers, a printer, etc. In embodiments, the computer system 500 and cold interaction system 522 may include input/output devices configured for generating, transmitting, and receiving machine readable codes. For example, in the case of an audio QR code, the computer system 500 and cold interaction system 522 may be configured to utilize speakers and microphones.

Figure 6:
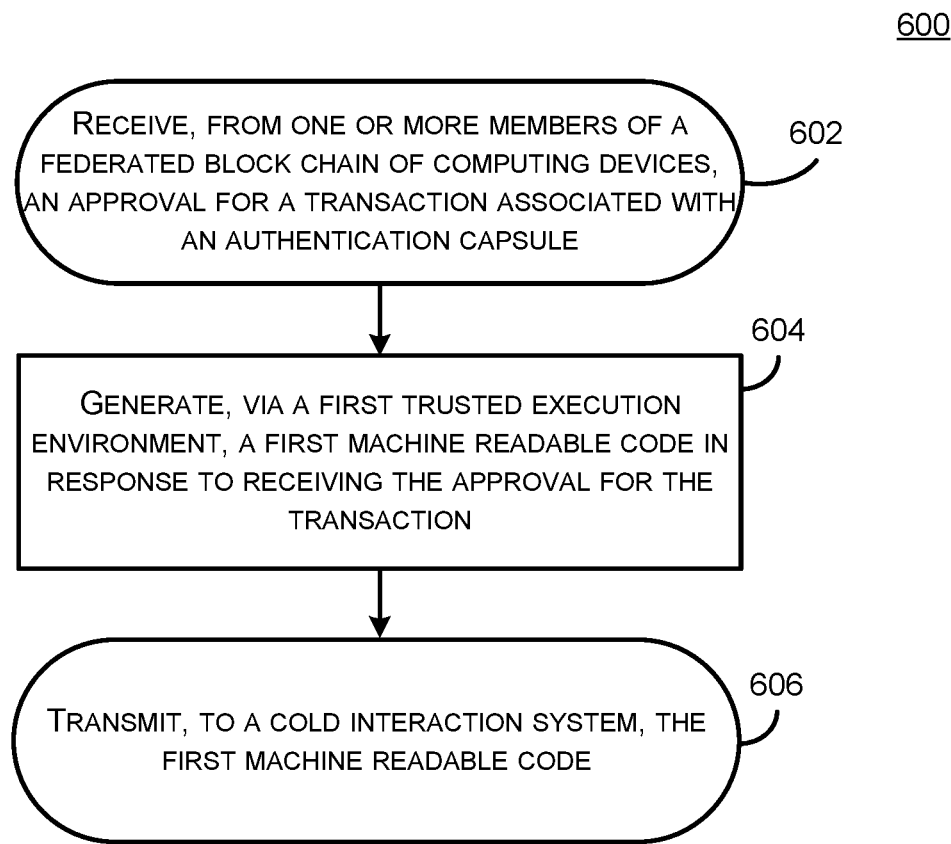
FIG. 6 shows a flowchart illustrating a method according to an embodiment of the disclosure.

FIG. 6 shows a flowchart illustrating a method according to an embodiment of the disclosure. FIG. 6 illustrates process 600 which can be performed by a gateway including computing devices or server computers associated with the gateway and/or cold interaction system including an offline server, hardware security module, and trusted execution environment illustrated in FIGS. 3 and 5.

Process 600 may begin by receiving, from one or more members of a federated blockchain of computing devices, an approval for a transaction associated with an authentication capsule at 602. The process 600 may include generating, via a first trusted execution environment, a first machine readable code in response to receiving the approval for the transaction at 604. The process 600 may include transmitting, to a cold interaction system, the first machine readable code at 606. In embodiments, the computer system may be configured to decrypt the second machine readable code. In embodiments, the computer system may be configured to transmit to one or more members of the federated interaction system information verifying completion of the transaction. Authentication policies specified by entities conducting transactions in the federated key custodian system may include a frequency of previous transactions associated with the entity conducting a current transaction. The frequency of previous transactions may increase or decrease the number of members of the federated interaction system that must authenticate or provide signatures for said transaction.

Figure 7:
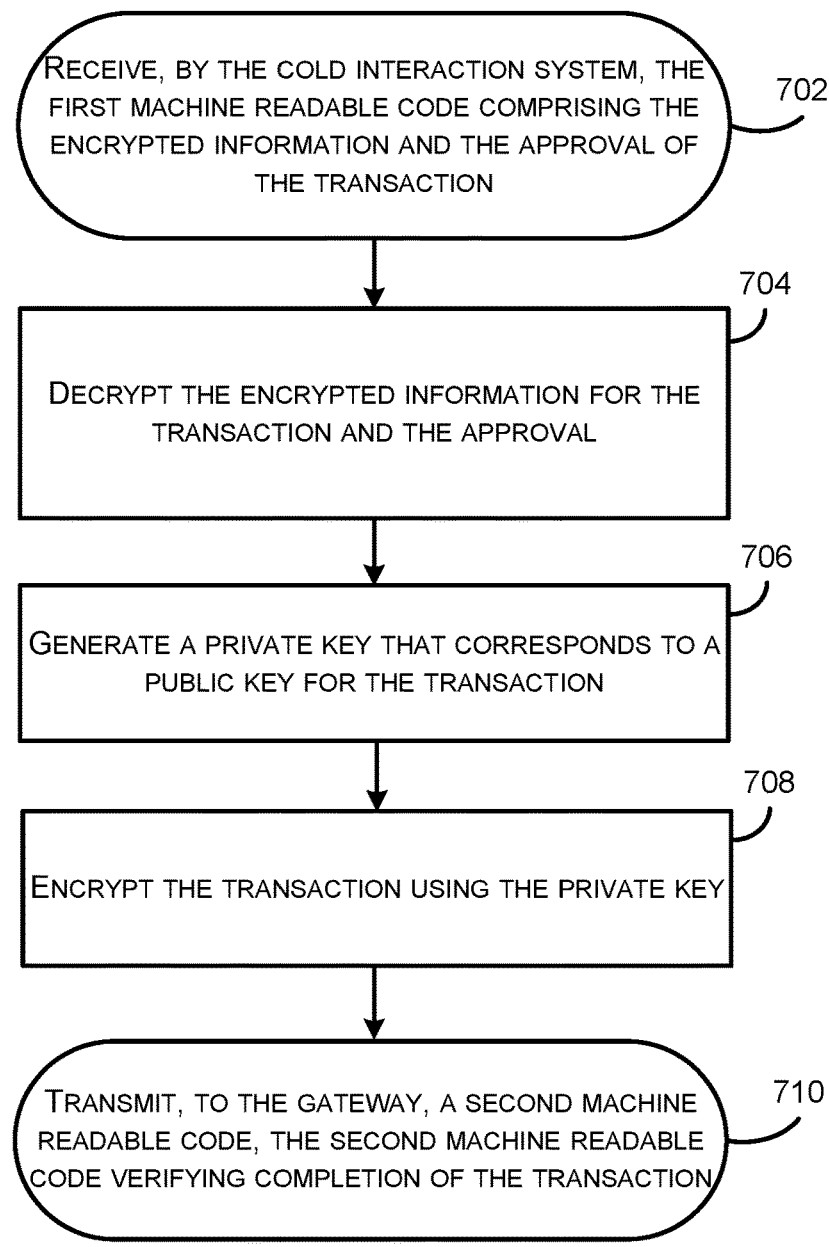
FIG. 7 shows a flowchart illustrating a method according to an embodiment of the disclosure.

FIG. 7 shows a flowchart illustrating a method according to an embodiment of the disclosure. FIG. 7 illustrates process 700 which can be performed by a gateway including computing devices or server computers associated with the gateway and/or cold interaction system including an offline server, hardware security module, and trusted execution environment illustrated in FIGS. 3 and 5.

Process 700 may begin by receiving, by the cold interaction system, the first machine readable code comprising the encrypted information and the approval of the transaction at 702. The process 700 may include decrypting the encrypted information for the transaction and the approval at 704. The process 700 may include generating a private key that corresponds to a public key for the transaction at 706. In embodiments, the cold interaction system may instruct an associated hardware security module to generate the private key. The process 700 may include encrypting the transaction using the private key at 708. The process 700 may conclude by transmitting, to the gateway, a second machine readable code that verifies completion of the transaction at 710.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary

What is claimed is:

1. A computer system, comprising:
a gateway comprising a first processor, and a first memory including instructions that, when executed by the first processor causes the gateway to:
receive, from a plurality of members of a federated blockchain on a network of computing devices, approvals for a transaction associated with an authentication capsule, wherein each of the plurality of members receives the authentication capsule and approves of the transaction based upon data in the authentication capsule, the authentication capsule including one or more authentication policies, encrypted credentials, and device and application metadata, the device and application metadata identifying a currency amount associated with the transaction or a frequency of previous transactions associated with a member of the plurality of members conducting the transaction, the one or more authentication policies identifying at least the plurality of members required to authenticate the transaction for the approvals and conditions for approving the transaction via the plurality of members of the federated blockchain on the network of computing devices based at least in part on the device and application metadata, a number of the plurality of members required to authenticate the transaction determined based on device data of a device conducting the transaction and a geographic location of the transaction, the device data including an IP address of the device and application data of the device;
generate, via a first trusted execution environment implemented by the computer system, a first machine readable code in response to receiving the approvals for the transaction, the first machine readable code including encrypted information for the transaction and the approvals; and
transmit, to a cold interaction system, the first machine readable code generated in response to receiving approvals for the transaction; and the cold interaction system comprising one or more processors and one or more memories, the one or more memories comprising instructions executable by the one or more processors to:
receive the first machine readable code comprising the encrypted information and the approvals;
decrypt the encrypted information for the transaction and the approvals from the first machine readable code;
generate a first private key that corresponds to a public key for the transaction, the public key maintained by the plurality of members of the federated blockchain on the network of computing devices;
encrypt the transaction using the first private key; and
transmit, to the gateway, a second machine readable code, the second machine readable code verifying completion of the transaction.

2. The computer system of claim 1, wherein the computer system is further configured to transmit to the plurality of members of the federated blockchain on the network of computing devices information verifying completion of the transaction.

3. The computer system of claim 2, wherein the plurality of members of the federated blockchain on the network of computing devices maintain an audit log of transactions conducted by the plurality of members that is updated with the information verifying completion of the transaction.

4. The computer system of claim 1, wherein the first machine readable code and the second machine readable code include an audio machine readable code that utilizes audible or inaudible sound frequencies.

5. The computer system of claim 4, wherein the cold interaction system further comprises an offline server, and wherein the gateway and the offline server are configured to utilize speakers and microphones for capturing and transmitting audio corresponding to the audio machine readable code.

6. The computer system of claim 1, wherein a member of the plurality of members signs the transaction as part of authenticating the transaction for approval.

7. The computer system of claim 1 wherein a member of the plurality of members generates the public key for the transaction.

8. The computer system of claim 1, wherein the gateway and the cold interaction system are physically separated and not in electrical communication with each other.

9. The computer system of claim 1, wherein the device data further includes SIM card data of the device.

10. The computer system of claim 1, wherein each hot wallet is utilized in an entity network domain of a respective associated entity.

11. The computer system according to claim 1, wherein the first trusted execution environment comprises a hot wallet.

12. A computer implemented method comprising:
receiving, by a computer system and from a plurality of members of a federated blockchain on a network of computing devices, approvals for a transaction associated with an authentication capsule, wherein each of the plurality of members receives the authentication capsule and approves of the transaction based upon data in the authentication capsule, the authentication capsule including one or more authentication policies, encrypted credentials, and device and application metadata, the device and application metadata identifying a currency amount associated with the transaction or a frequency of previous transactions associated with a member of the plurality of members conducting the transaction, the one or more authentication policies identifying at least the plurality of members required to authenticate the transaction for the approvals and conditions for approving the transaction via the plurality of members of the federated blockchain on the network of computing devices based at least in part on the device and application metadata, a number of the plurality of members required to authenticate the transaction determined based on device data of a device conducting the transaction and a geographic location of the transaction, the device data including an IP address of the device and application data of the device;
generating, via a first trusted execution environment implemented by the computer system, a first machine readable code in response to receiving the approvals for the transaction, the first machine readable code including encrypted information for the transaction and the approvals;
transmitting, to an offline server, the first machine readable code generated in response to receiving approvals for the transaction; by presenting the first machine readable code to the offline server; and
receiving, from the offline server, a second machine readable code generated by the offline server in a second trusted execution environment, the second machine readable code verifying completion of the transaction, wherein the offline server is configured for:

receiving the first machine readable code;
verifying proximity of the computer system to the offline server in response to receiving the first machine readable code;
decrypting, via the second trusted execution environment implemented by the offline server, the encrypted information for the transaction and the approvals from the first machine readable code in response to verifying proximity of the computer system;
requesting, via an associated hardware security module, for generation of a private key that corresponds to a public key for the transaction, the public key maintained by the plurality of members of the federated blockchain on the network of computing devices;
encrypting, via the second trusted execution environment, the transaction using the private key from the hardware security module; and
transmitting, to the computer system, the second machine readable code.

13. The computer-implemented method of claim 12, further comprising transmitting to the plurality of members of the federated blockchain on the network of computing devices information verifying completion of the transaction.

14. The computer-implemented method of claim 13, wherein the plurality of members of the federated blockchain of computing devices are configured to maintain an audit log of transactions conducted by the plurality of members that is updated with the information verifying completion of the transaction.

15. A computer-implemented method comprising:
generating, by a computer system, a first audio machine readable code in response to receiving approvals for a transaction from a plurality of members of a federated blockchain on a network of computing devices, the first audio machine readable code including encrypted information for the transaction and the approval, the approvals associated with an authentication capsule, the authentication capsule including one or more authentication policies, encrypted credentials, and device and application metadata, the device and application metadata identifying a currency amount associated with the transaction or a frequency of previous transactions associated with a member of the plurality of members conducting the transaction, the one or more authentication policies identifying the plurality of members required to authenticate the transaction for the approvals and conditions for approving the transaction via the plurality of members of the federated blockchain on the network of computing devices based at least in part on the device and application metadata, a number of the plurality of members determined based on device data of a device conducting the transaction and a geographic location of the transaction, the device data including an IP address of the device and application data of the device, wherein each of the plurality of members receives the authentication capsule and approves of the transaction based upon data in the authentication capsule; and
transmitting, to an offline server, the first audio machine readable code generated in response to receiving approvals for the transaction by presenting the first audio machine readable code to the offline server, wherein the offline server is configured for:
receiving the first audio machine readable code;
verifying proximity of the computer system to the offline server in response to receiving the first audio machine readable code;
decrypting, via a trusted execution environment implemented by the offline server, the encrypted information for the transaction and the approvals from the first audio machine readable code in response to verifying proximity of the computer system;
requesting, via an associated hardware security module, for generation of a private key that corresponds to a public key for the transaction, the public key maintained by the plurality of members of the federated blockchain on the network of computing devices;
encrypting, via the trusted execution environment, the approvals of the transaction using the private key from the hardware security module;
generating a second audio machine readable code that includes the approvals of the transaction; and
transmitting, to the computer system, the second audio machine readable code.

* * * * *